(12) United States Patent
Sedmak

(10) Patent No.: US 7,243,282 B2
(45) Date of Patent: Jul. 10, 2007

(54) METHOD AND APPARATUS FOR IMPLEMENTING MULTIPLE REMOTE DIAGNOSE REGISTER CHAINS

(75) Inventor: Michael C. Sedmak, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1264 days.

(21) Appl. No.: 10/207,512

(22) Filed: Jul. 29, 2002

(65) Prior Publication Data

US 2004/0019829 A1    Jan. 29, 2004

(51) Int. Cl.
*G01R 31/28* (2006.01)

(52) U.S. Cl. .................................... 714/729; 714/30

(58) Field of Classification Search .................. 377/64; 714/39, 726, 729, 30; 712/21; 365/78; 711/217
See application file for complete search history.

(56) References Cited

U.S. PATENT DOCUMENTS

| | | | |
|---|---|---|---|
| 5,333,139 A | 7/1994 | Sturges | |
| 5,377,199 A | 12/1994 | Fandrich | |
| 5,434,804 A | 7/1995 | Bock et al. | |
| 5,448,525 A | 9/1995 | Sturges | |
| 5,491,666 A | 2/1996 | Sturges | |
| 5,644,609 A * | 7/1997 | Bockhaus et al. | 377/64 |
| 5,768,289 A | 6/1998 | James | |
| 5,867,644 A * | 2/1999 | Ranson et al. | 714/39 |
| 5,956,476 A * | 9/1999 | Ranson et al. | 714/30 |
| 6,009,539 A * | 12/1999 | Ranson | 714/30 |
| 6,038,651 A * | 3/2000 | VanHuben et al. | 712/21 |
| 6,175,518 B1 * | 1/2001 | Scott et al. | 365/78 |
| 6,266,793 B1 | 7/2001 | Mozdzen et al. | |
| 6,321,320 B1 * | 11/2001 | Fleischman et al. | 711/217 |
| 6,374,370 B1 * | 4/2002 | Bockhaus et al. | 714/39 |
| 6,691,270 B2 * | 2/2004 | Blasco Allue et al. | 714/729 |

* cited by examiner

*Primary Examiner*—David Ton

(57) ABSTRACT

Method and apparatus for implementing a plurality of RDR chains, wherein each of the RDR chains comprises at least one RDR is described. In one embodiment, the method comprises, responsive to execution of a first instruction identifying one of the RDR chains and one of the RDRs of the identified RDR chain, reading data from the identified RDR of the identified RDR chain and, responsive to issuance of a second instruction identifying one of the RDR chains and one of the RDRs of the identified RDR chain, writing data to the identified RDR of the identified RDR chain.

25 Claims, 5 Drawing Sheets

METHOD AND APPARATUS FOR IMPLEMENTING MULTIPLE REMOTE DIAGNOSE REGISTER CHAINS

BACKGROUND OF THE INVENTION

1. Technical Field of the Invention

The present invention generally relates to integrated circuits ("ICs"). More particularly, and not by way of any limitation, the present invention is directed to a method and apparatus for facilitating the implementation of multiple remote diagnose register chains in an IC.

2. Description of Related Art

As the size of integrated circuits ("ICs") continues to shrink while the number of elements included thereon continues to grow, testing such circuits has become increasingly difficult. To ensure the accuracy with which testing can be performed on such circuits, diagnostic testing circuitry can be built into an IC. In one embodiment, data may be serially transferred to or from a staging register through a plurality of shift register stages positioned at various locations throughout the IC. In this manner, circuit testing of the IC can be quickly and accurately conducted.

FIG. 1A illustrates an implementation of a remote diagnose register chain 100 in accordance with the prior art. The chain 100 comprises a staging register 102 and multiple remote diagnose registers ("RDRs"), respectively designated in FIG. 1A by reference numerals 104(0)–104(n-1) all connected in series, with the output of each register 102, 104(0)–104(n-1), in the chain 100 being connected to the input of the next register in the chain. The staging register 102 and each of the RDRs 104(0)–104(n-1) are conventional 64-bit serial shift registers.

In a typical implementation, for reasons that will be described in greater detail below, the chain is limited to 32 RDRs. Accordingly, n is also limited to 32. As will also be described below, during a write operation, data is serially shifted under appropriate control logic, one bit at a time, out of the staging register 102 and along the chain 100 in a single direction (which in the illustrated embodiment is clockwise) until it reaches a designated one of the RDRs 104(0)–104(n-1), at which point it is written into that RDR.

During a read operation, data is serially shifted, again one bit at a time, from a designated one of the RDRs 104(0)–104(n-1) along the chain in the same direction as previously described until it reaches the staging register 102, at which point, it is written into the staging register.

The embodiment illustrated in FIG. 1A functions adequately for an IC that includes a single processor core; however, in most applications, a single core utilizes almost all of the 32 RDRs. Accordingly, as complexity has increased and more processor cores, as well as shared functional units, are included on a single die, more RDRs for use as configuration and error logging registers are needed. However, as previously alluded to, current standards, which provide for designation of a particular RDR within a chain by a five-bit number, limit the number of RDRs included in an RDR chain to 32 registers.

Additionally, there is currently no method of handling a situation in which all cores need to be able to access the same shared data.

SUMMARY OF THE INVENTION

Accordingly, the present invention advantageously provides a system and method for enabling implementation of multiple chains of RDRs in an integrated circuit. In particular, in one embodiment, the invention enables implementation of up to 32 chains of up to 32 RDRs each.

In one embodiment, the invention is directed to a scheme for implementing a plurality of RDR chains, wherein each of the RDR chains comprises at least one RDR. The scheme comprises, responsive to execution of a first instruction identifying one of the RDR chains and one of the RDRs of the identified RDR chain, reading data from the identified RDR of the identified RDR chain and, responsive to issuance of a second instruction identifying one of the RDR chains and one of the RDRs of the identified RDR chain, writing data to the identified RDR of the identified RDR chain.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1A:
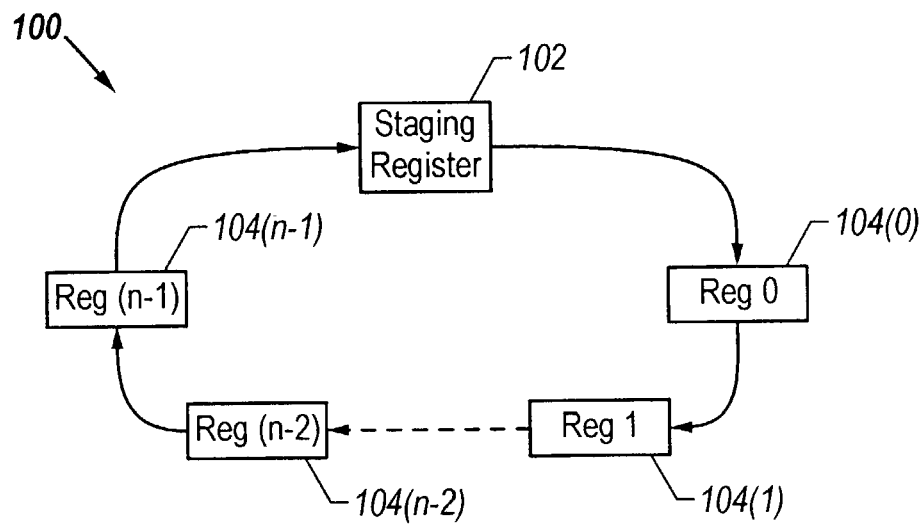
FIG. 1A (Prior Art) is a block diagram illustrating an implementation of a current RDR chain.

In the drawings, like or similar elements are designated with identical reference numerals throughout the several views thereof, and the various elements depicted are not necessarily drawn to scale.

Figure 1B:
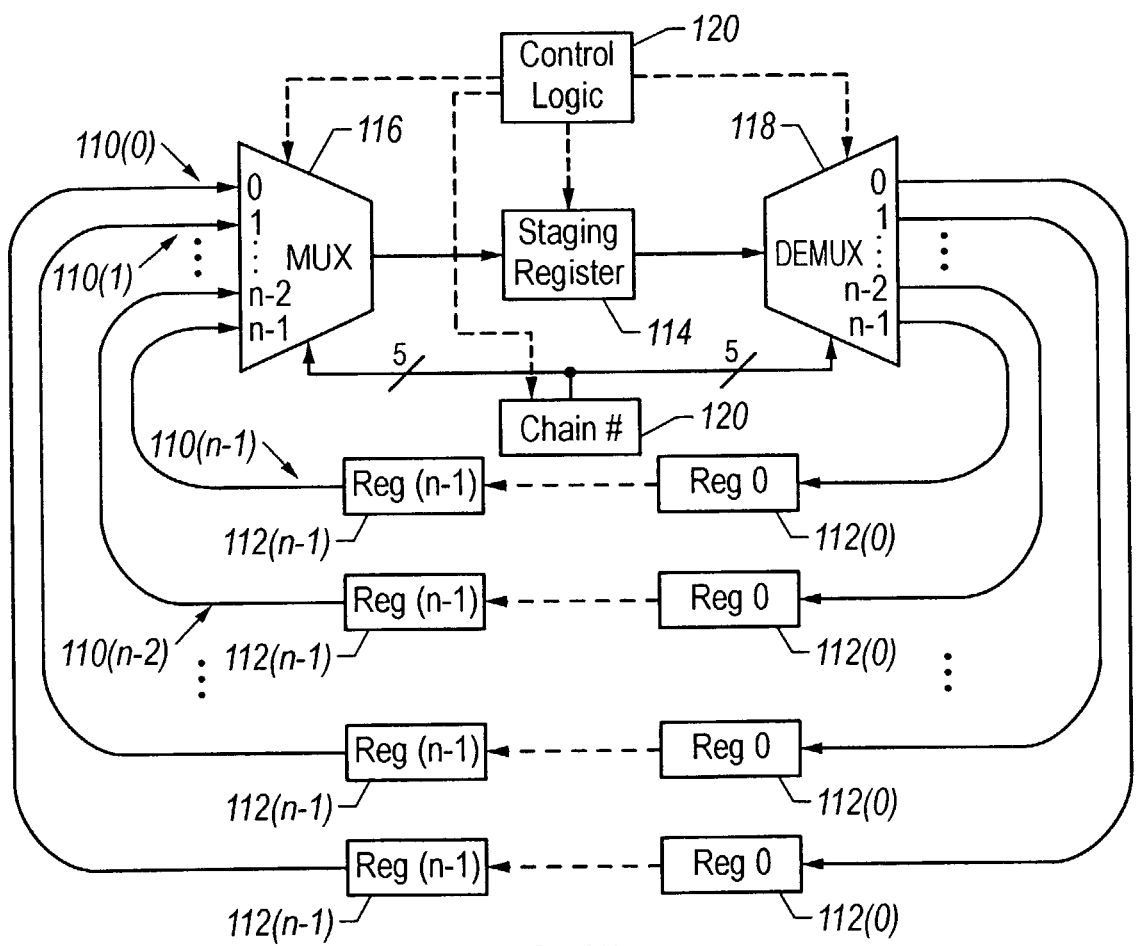
FIG. 1B is a block diagram illustrating an implementation of multiple RDR chains in accordance with one embodiment of the present invention.

FIG. 1B illustrates an implementation of multiple RDR chains, respectively designated 110(0)–110 (n-1), in accordance with one embodiment of the present invention. For reasons that will be described in greater detail below, it is possible to implement 32 chains; accordingly, n may be any number up to and including 32. As illustrated in FIG. 1B, each chain 110(0)–110(n-1) comprises multiple 64-bit serial shift RDRs 112(0)–112 (n-1).

Similar to the embodiment illustrated in FIG. 1A, the embodiment illustrated in FIG. 1B includes a 64-bit serial shift staging register 114; however, as will be described in greater detail below, data is shifted into the staging register from one of the chains 110(0)–110(n-1) via a multiplexer ("MUX") 116 and out of the staging register 114 to one of the chains 110(0)–110(n-1) via a demultiplexer ("DEMUX") 118. In particular, the "input end" of each chain 110(0)–110(n-1) is connected to a corresponding one of n outputs of the DEMUX 118. Similarly, the "output end" of each chain 110(0)–110(n-1) is connected to a corresponding one of n inputs of the MUX 116. A chain number 120 captured from a "shift-to" (write) or "shift-from" (read) instruction, as described below, is captured and used as a control signal to the MUX 116 and DEMUX 118 to control which to chain 110(0)–110(n-1) the staging register 114 is connected for the operation.

The embodiment illustrated in FIG. 1B operates in a manner similar to that described above with reference to FIG. 1A, except that, during both read and write operations, in addition to designating a register to be read from/written to using a five-bit RDR number, the read (shift-to or "STDIAG") or write (shift-from or "SFDIAG") instruction also designates a chain by its five-bit chain number. Accordingly, data is shifted to or from a designated RDR in a designated chain. In this manner, up to 32 chains of up to 32 RDRs each, or a maximum of 1024 RDRs, may be deployed in a system.

It will be recognized that control logic 120 oversees the operation of the embodiment illustrated in FIG. 1B as will be described in greater detail below.

Figure 2A:
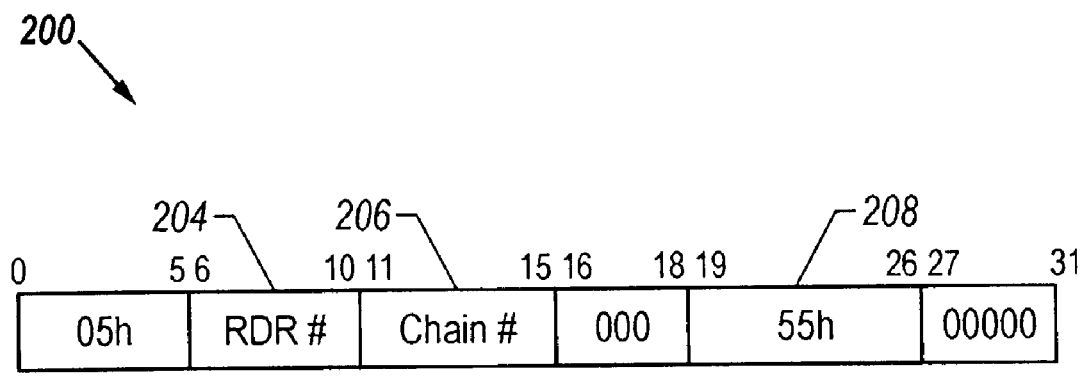
FIG. 2A illustrates a format of an STDIAG instruction for use in connection with the multiple RDR chain implementation illustrated in FIG. 1B.
Figure 2B:
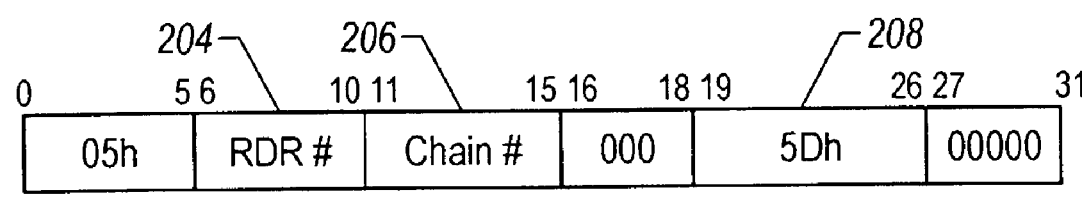
FIG. 2B illustrates a format of an SFDIAG instruction for use in connection with the multiple RDR chain implementation illustrated in FIG. 1B.

FIGS. 2A and 2B respectively illustrate exemplary opcode formats for STDIAG and SFDIAG instructions 200, 202, for implementing an embodiment of the present invention. In particular, a field 204 of the STDIAG instruction opcode 200 and the SFDIAG instruction opcode 202, comprising bits 6–10 thereof, contains an RDR number ("RDR#") designating one of the RDRs 112(0)–112(n-1) to be written to and read from, respectively. A field 206 of the STDIAG instruction opcode 200 and the SFDIAG instruction opcode 202, comprising bits 11–15 thereof, contains a chain number ("CHAIN#") designating one of the chains 110(0)–110(n-1) to be connected to the staging register 114 during the write and read operations, respectively. A field 208 of the STDIAG instruction opcode 200 and the SFDIAG instruction opcode 202, comprising bits 19–26 thereof, identify the instruction as a read (STDIAG) instruction, in which case the field 208 will contain 55$h$, or a write (SFDIAG) instruction, in which case the field 208 will contain 5D$h$.

Figure 3:
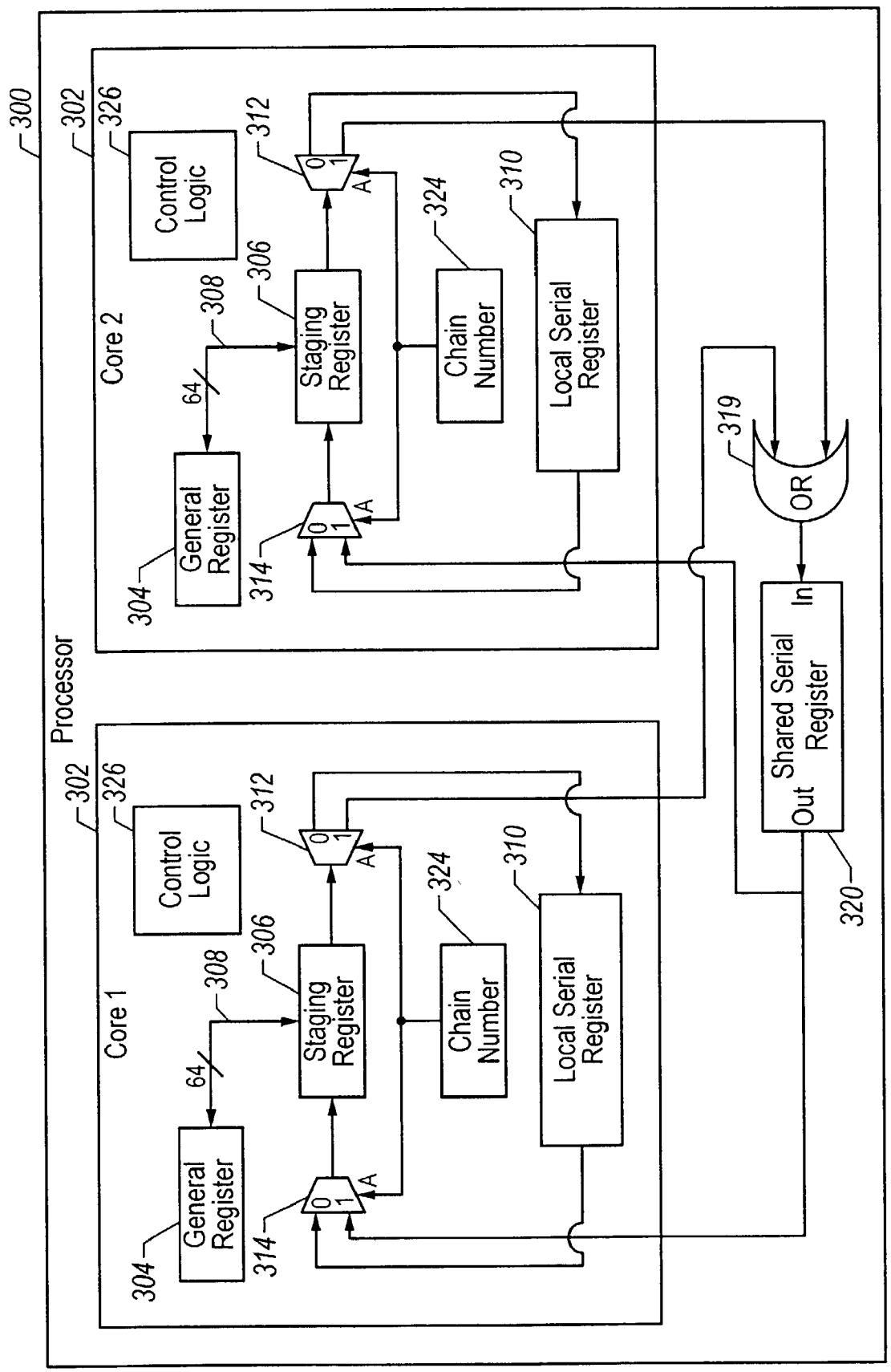
FIG. 3 is a more detailed block diagram illustrating an embodiment of multiple RDR chains in multi-core processor IC.

FIG. 3 is a block diagram of an IC 300 in which multiple diagnose register chains are implemented in accordance with one embodiment. The IC 300 is a multi-processor IC that includes two processor cores 302. Each of the processor cores 302 includes a 64-bit general register 304 connected to a 64-bit staging register 306 via a 64-bit wide bus 308. The purpose of the general register 304 is to provide a data interface with the staging register. In particular, data may be written to the general register 304 by, for example, a diagnostic program, and then shifted into the staging register 306 to be written to an RDR as described herein. Similarly, data read from an RDR, as described herein, may be shifted from the staging register 306 into the general register for access by, for example, a diagnostic program.

Each staging register 306 is a serial shift register, the output of which is connected to the input of a two-output DEMUX 312. A first output of each of the DEMUXes 312 is connected to the input of a local serial register, or RDR, 310. The output of each of the registers 310 is connected to a first input of a two-input MUX 314. The output of each of the MUXes 314 is connected to the input of the staging register 306.

A second output of each of the DEMUXes 312 is connected a respective input of a two-input OR gate 319, the output of which is connected to an input of a single shared serial register 320. The output of the shared serial register 320 is connected to a second input of the MUX 314. A chain number 324 is provided as a control signal for the MUXes 314 and DEMUXes 312. As illustrated in FIG. 3, a first chain, designated "chain 0" is the "local chain" (comprising the staging register 306 and the local serial register 310), and second chain, designated "chain 1" is the "shared chain" (comprising the staging register 306 and the shared serial register 320). It will be understood that the shared serial register 320 enables sharing of remote diagnose data between the cores 302. Appropriate control logic for controlling operation of the embodiment as described hereinbelow is designated by a reference numeral 326.

Figure 4A:
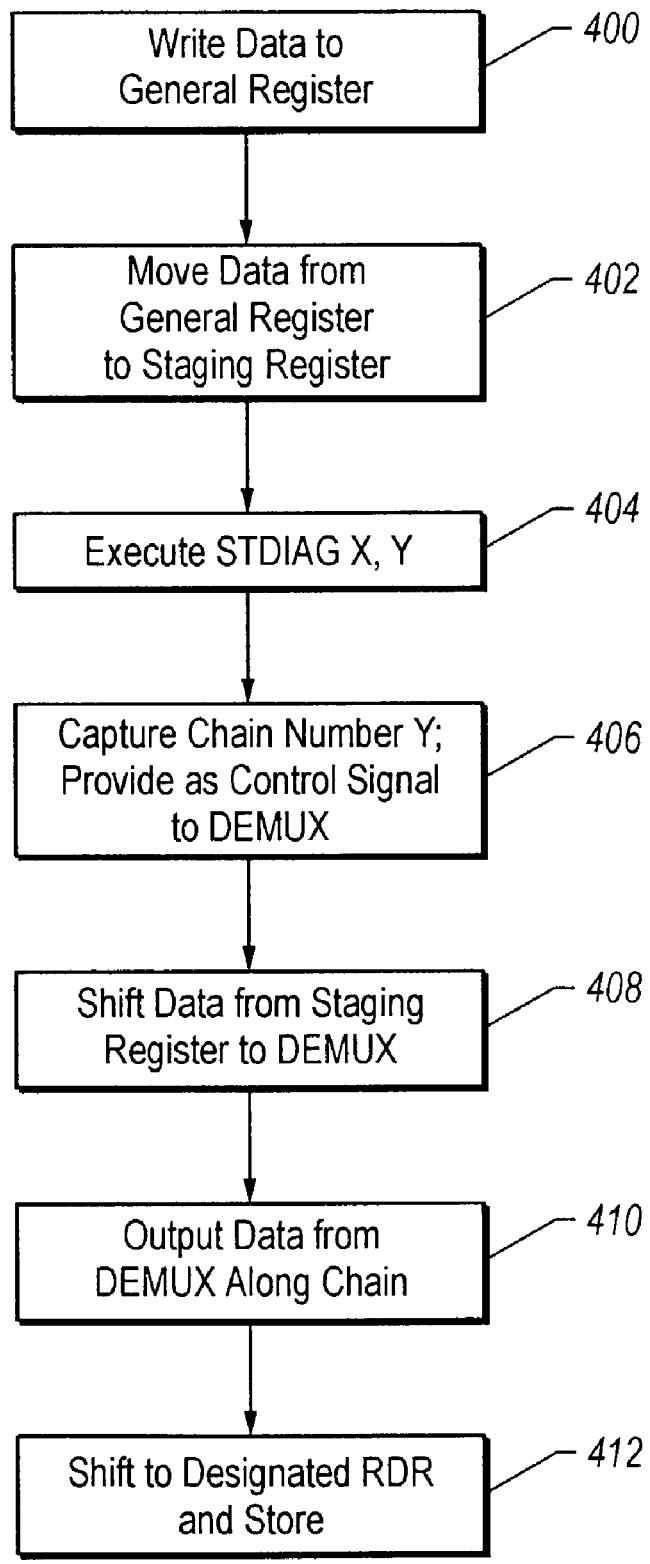
FIG. 4A is a flowchart illustrating operation of an embodiment of the multiple RDR chain implementation illustrated in FIG. 1B for reading data from a selected RDR.

FIG. 4A is a flowchart illustrating operation of one embodiment for writing data to a designated RDR. It will be recognized that the operations illustrated in and described with reference to FIG. 4A will typically be initiated or carried out by a processor or controller executing appropriate software instructions. In block 400, data to be written to an RDR is written to a general register in a conventional manner. In block 402, the data is moved from the general register to a staging register, such as the staging register 114 (FIG. 1B), e.g., by executing a "MTDIAG" instruction. In block 404, an "STDIAG X, Y" instruction, where X is a five-bit RDR number, and thus can designate one of 32 different RDRs, and Y is a five-bit chain number, and thus can designate one of up to 32 different chains of RDRs, is executed. In block 406, the chain number Y is captured and provided as a control signal to a DEMUX connected to the staging register, such as the DEMUX 118. In block 408, the data is shifted out of the staging register and into the DEMUX. In block 410, the data is output from the DEMUX on the line corresponding to the chain number provided as a control signal to the DEMUX (block 406). In block 412, the data is shifted along the chain until it reaches the designated RDR X, where it is stored.

For example, referring to FIGS. 1B and 4A, it will be assumed that n is equal to 32, such that chains 110(0) through 110(n-1) respectively correspond to chain#s 0 through 32, and registers 112(0) through 112 (n-1) respectively correspond to RDR#s 0 through 32. Accordingly, to write data to register 112(32) on chain 110(31), data is written to a general register (not shown) connected to the staging register 114 (block 400) and is then moved from the general register to the staging register 114 (block 402). At this point, responsive to execution of an STDIAG 32, 31, instruction, the chain number (31) is captured and provided to control inputs of the DEMUX 118 such that the chain 110(31) is connected to the staging register 114 via the DEMUX 118 (blocks 404, 406). The data is serially shifted from the staging register 114, through the DEMUX 118, and along the chain 110(31) until it reaches the register 112(32) (blocks 408, 410), at which point it is stored in the register 112(32) (block 412).

Figure 4B:
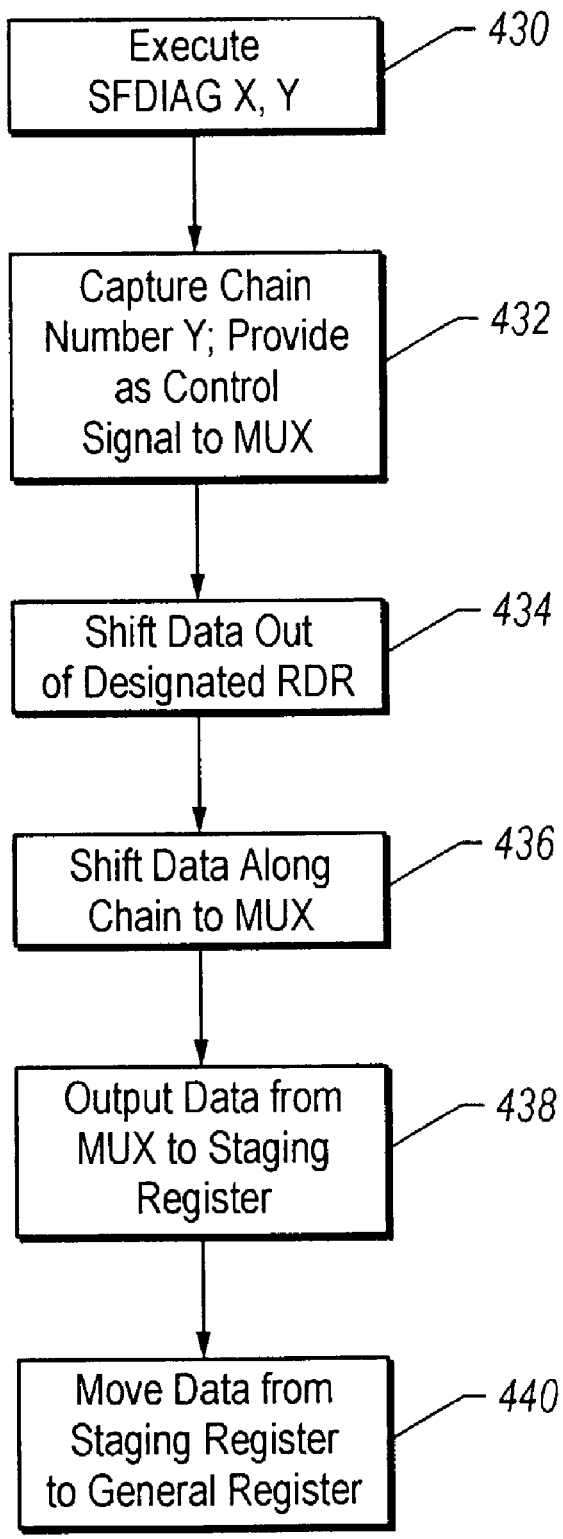
FIG. 4B is a flowchart illustrating operation of an embodiment of the multiple RDR chain implementation illustrated in FIG. 1B for writing data to a selected RDR.

FIG. 4B is a flowchart illustrating operation of one embodiment for reading data from an RDR. It will be recognized that the operations illustrated in and described with reference to FIG. 4B will typically be initiated or carried out by a processor or controller executing appropriate software instructions. In block 430, an SFDIAG X, Y instruction, where X designates an RDR number and Y designates a chain number, is executed. In block 432, the chain number Y is captured and provided as a control signal to the MUX. In block 434, data stored in the RDR identified by the chain and RDR numbers is shifted out of the RDR along the designated chain into and out of other RDRs in the chain until it reaches the MUX. In block 436, data is input to the MUX via an input line corresponding to the designated chain. As previously noted, the use of the chain number as a control signal to the MUX (block 432) results in selection of the line corresponding to the designated chain for output from the MUX. In block 438, the data is output from the MUX into the staging register. In block 440, the data may be moved from the staging register to a general register to be accessed and/or processed by other hardware and/or software.

For example, referring to FIGS. 1B and 4B, it will be assumed n is equal to 32, such that chains 110(0) through 110(n-1) respectively correspond to chain#s 0 through 32, and registers 112(0) through 112 (n-1) respectively correspond to RDR#s 0 through 32. Accordingly, to read data from register 112(32) on chain 110(31), an SFDIAG 32, 31 instruction is executed (block 430). The chain number (31) is provided to control inputs of the MUX 116 such that the chain 110(31) is connected to the input of the staging register 114 via the MUX 116 (block 432). The data is serially shifted along the chain 110(31) until it reaches the staging register 114 (blocks 434–438), at which point it may be moved from the staging register 114 to a general register (not shown) by executing an MFDIAG instruction (block 440). Once the data is in the general register, it may be accessed as necessary to perform diagnostic functions.

It will be recognized that, although current standards dictate the limitation of the number of RDRs per chain to 32, the principles of the present invention are not so limited. Similarly, although the maximum number of chains is described as being thirty-two, it is anticipated that more such chains could be implemented in cases in which it may be possible to change the size of the CHAIN# field of the STDIAG and SFDIAG instruction opcodes.

Although the invention has been described with reference to certain illustrations, it is to be understood that the forms of the invention shown and described are to be treated as exemplary embodiments only. Various changes, substitutions and modifications can be realized without departing from the spirit and scope of the invention as defined by the appended claims.

What is claimed is:

1. A system for implementing a plurality of remote diagnose register ("RDR") chains, wherein each of the RDR chains comprises at least one RDR, the system comprising:
   a staging register having an input and an output;
   a multiplexer ("MUX") including an output connected to the staging register input, a plurality of inputs each connected to a different one of the plurality of RDR chains, and at least one control input; and
   a demultiplexer ("DEMUX") including an input connected to the staging register output, a plurality of outputs each connected to a different one of the plurality of RDR chains, and at least one control input, wherein responsive to execution of an instruction including a chain number identifying one of the plurality of RDR chains and an RDR number identifying an RDR of the identified RDR chain, the chain number is provided to the at least one control input of the MUX and to the at least one control input of the DEMUX.

2. The system of claim 1 wherein the instruction comprises a shift-from instruction and wherein responsive to execution of the shift-from instruction, data to be written to the identified RDR is shifted from the identified RDR along the identified chain to the staging register via the MUX.

3. The system of claim 1 wherein the instruction comprises a shift-to instruction and wherein responsive to execution of the shift-to instruction, data stored in the identified RDR is shifted from the staging register along the identified chain to the identified RDR via the DEMUX.

4. The system of claim 1 further comprising a general register connected to the staging register.

5. The system of claim 4 wherein the data to be written to the identified RDR is moved from the general register to the staging register prior to execution of a shift-to instruction.

6. The system of claim 4 wherein the data shifted from the identified RDR to the staging register is moved from the staging register to the general register subsequent to execution of the shift from instruction.

7. The system of claim 1 wherein the staging register is a serial shift register.

8. The system of claim 1 wherein each RDR is a serial shift register.

9. The system of claim 1 wherein the RDR number is a five-bit number.

10. The system of claim 1 wherein the chain number is a five-bit number.

11. The system of claim 1 wherein at least one RDR is a shared serial register.

12. An apparatus for implementing a plurality of remote diagnose register ("RDR") chains, wherein each of the RDR chains comprises at least one RDR, the apparatus comprising:
    means responsive to execution of a first instruction identifying one of the RDR chains and one of the RDRs of the identified RDR chain for reading data from the identified RDR of the identified RDR chain; and
    means responsive to issuance of a second instruction identifying one of the RDR chains and one of the RDRs of the identified RDR chain for writing data to the identified RDR of the identified RDR chain.

13. The apparatus of claim 12 further comprising means responsive to execution of a first instruction for shifting the data from the identified RDR along the identified chain to a staging register.

14. The apparatus of claim 13 further comprising means for providing a chain number corresponding to the identified chain to at least one control input of a multiplexer ("MUX").

15. The apparatus of claim 14 wherein an input of the staging register is connected to an output of the MUX, and wherein the means for shifting the data from the identified register further comprises means for shifting the data into the MUX on a line corresponding to the identified chain.

16. The apparatus of claim 12 further comprising means responsive to execution of a second instruction for shifting the data from a staging register along the identified chain to the identified RDR and storing the data in the identified RDR.

17. The apparatus of claim 16 further comprising means for providing a chain number corresponding to the identified chain to at least one control input of a demultiplexer ("DEMUX").

18. The apparatus of claim 17 wherein an output of the staging register is connected to an input of the DEMUX, and wherein the means for shifting the data from the staging register further comprises means for shifting the data out of the DEMUX on a line corresponding to the identified chain.

19. A method of implementing a plurality of remote diagnose register ("RDR") chains, wherein each of the RDR chains comprises at least one RDR, the method comprising:
    responsive to execution of a first instruction identifying one of the RDR chains and one of the RDRs of the identified RDR chain, reading data from the identified RDR of the identified RDR chain; and
    responsive to issuance of a second instruction identifying one of the RDR chains and one of the RDRs of the identified RDR chain, writing data to the identified RDR of the identified RDR chain.

20. The method of claim 19 further comprising, responsive to execution of the second instruction:
  shifting the data from a staging register along the identified chain to the identified RDR; and
  storing the data in the identified RDR.

21. The method of claim 20 further comprising:
  providing a chain number corresponding to the identified chain to at least one control input of a demultiplexer ("DEMUX").

22. The method of claim 21 wherein an output of the staging register is connected to an input of the DEMUX, and wherein shifting the data from the staging register further comprises shifting the data out of the DEMUX on a line corresponding to the identified chain.

23. The method of claim 19 further comprising, responsive to execution of the first instruction, shifting the data from the identified RDR along the identified chain to a staging register.

24. The method of claim 23 further comprising:
  providing a chain number corresponding to the identified chain to at least one control input of a multiplexer ("MUX").

25. The method of claim 24 wherein an input of the staging register is connected to an output of the MUX, and wherein shifting the data from the identified register further comprises shifting the data into the MUX on a line corresponding to the identified chain.

* * * * *